US012609535B2

(12) United States Patent
Song et al.

(10) Patent No.: US 12,609,535 B2
(45) Date of Patent: Apr. 21, 2026

(54) VOLTAGE CONTROL DEVICE AND VOLTAGE CONTROL METHOD CONSIDERING POWER LOSS DUE TO LINES

(71) Applicant: CROCUS INC., Seoul (KR)

(72) Inventors: Myeong Hoon Song, Seoul (KR); Bok Nyun Kim, Seoul (KR); Daniel Jesuph Lim, Seoul (KR)

(73) Assignee: CROCUS INC., Seoul (KR)

( * ) Notice: Subject to any disclaimer, the term of this patent is extended or adjusted under 35 U.S.C. 154(b) by 384 days.

(21) Appl. No.: 18/237,965

(22) Filed: Aug. 25, 2023

(65) Prior Publication Data

US 2024/0396343 A1 Nov. 28, 2024

(30) Foreign Application Priority Data

May 26, 2023 (KR) ........................ 10-2023-0068010

(51) Int. Cl.
*H02J 3/46* (2006.01)
*H02J 3/00* (2006.01)
(52) U.S. Cl.
CPC ................ *H02J 3/46* (2013.01); *H02J 3/004* (2020.01); *H02J 2203/20* (2020.01)
(58) Field of Classification Search
USPC ........................................................ 700/286
See application file for complete search history.

(56) References Cited

U.S. PATENT DOCUMENTS

| | | | | |
|---|---|---|---|---|
| 4,797,805 | A * | 1/1989 | Nimmersjo ............ | G01R 31/11 |
| | | | | 324/509 |
| 2018/0158152 | A1 * | 6/2018 | Jereminov ................ | H02J 3/16 |
| 2020/0150707 | A1 * | 5/2020 | Varma ...................... | H02J 3/381 |
| 2022/0360082 | A1 * | 11/2022 | Ren ........................... | H02J 3/12 |
| 2024/0291274 | A1 * | 8/2024 | Hedman ................... | H02J 3/16 |

OTHER PUBLICATIONS

KR_20190087186_A (Year: 2019).*
KR_20220126446_A (Year: 2022).*
CN_114460358_B (Year: 2025).*
CN_108573330_B (Year: 2021).*
Xiao et al. "A Method of Finding a Weak Point in Distribution Network", IEEE, 2023, p. 529-534. (Year: 2023).*

* cited by examiner

*Primary Examiner* — Hien D Khuu
(74) *Attorney, Agent, or Firm* — The PL Law Group, PLLC

(57) ABSTRACT

A voltage control device includes a voltage control module being able to regulate a voltage that is supplied to a load or is transmitted backward from a load, a power loss predictor predicting or calculating a power loss amount due to a line of a power system, and a cooperative controller giving the target voltage to the voltage regulation module. A voltage control method includes a data collection step in which power data of a voltage regulation module, which is configured to regulate a voltage that is supplied to a load or is transmitted backward from a load, are transmitted to a data collector, a target voltage calculation step of calculating a target voltage to be regulated of the voltage regulation module, and a voltage control step of controlling the voltage regulation module at a target voltage or giving the target voltage to the voltage regulation module.

13 Claims, 8 Drawing Sheets

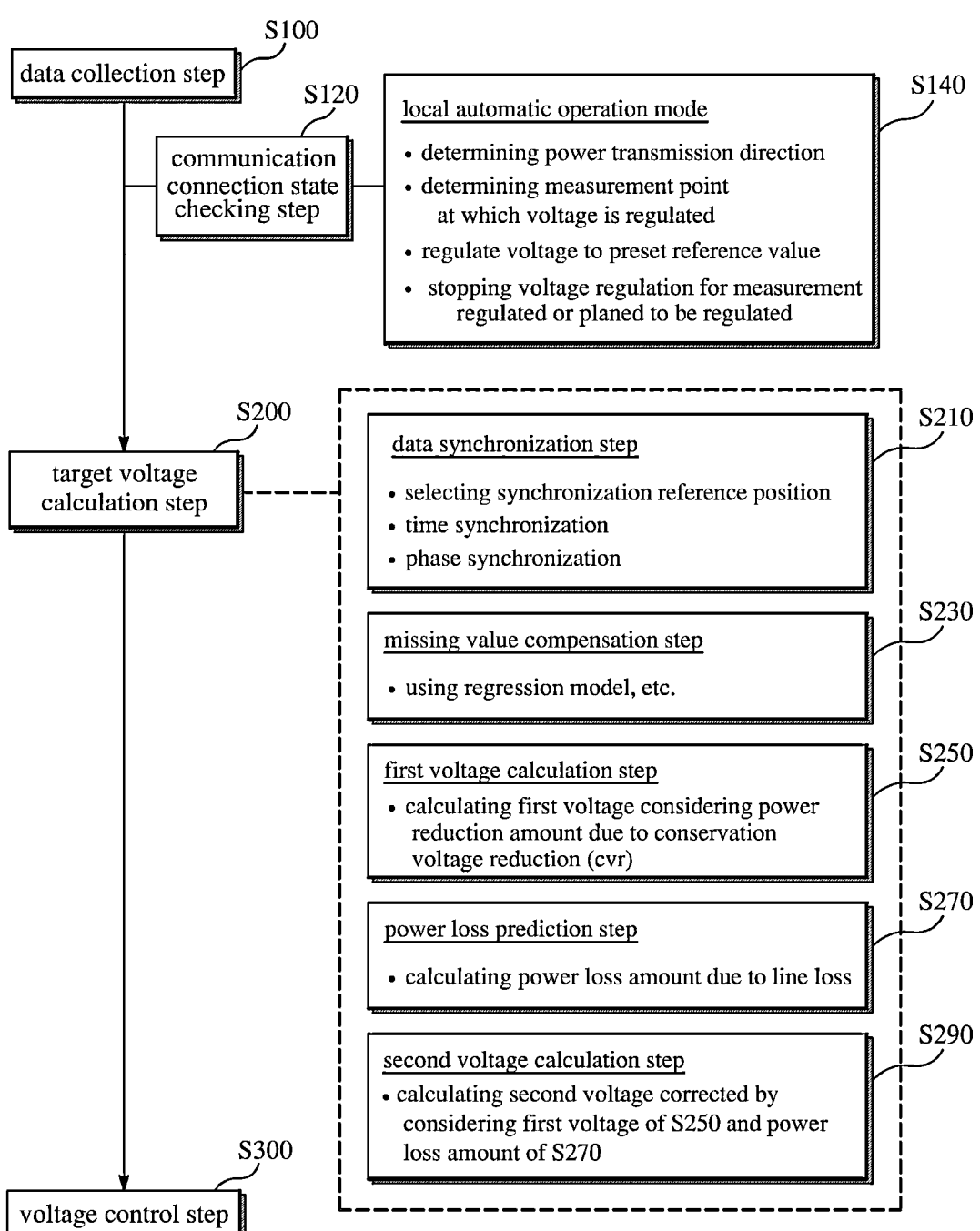

S100 data collection step

S120 communication connection state checking step

S140 local automatic operation mode

• determining power transmission direction
• determining measurement point
   at which voltage is regulated
• regulate voltage to preset reference value
• stopping voltage regulation for measurement
   regulated or planed to be regulated

S200 target voltage calculation step

S210 data synchronization step

• selecting synchronization reference position
• time synchronization
• phase synchronization

S230 missing value compensation step

• using regression model, etc.

S250 first voltage calculation step

• calculating first voltage considering power
   reduction amount due to conservation
   voltage reduction (cvr)

S270 power loss prediction step

• calculating power loss amount due to line loss

S290 second voltage calculation step

• calculating second voltage corrected by
   considering first voltage of S250 and power
   loss amount of S270

S300 voltage control step

FIG. 3

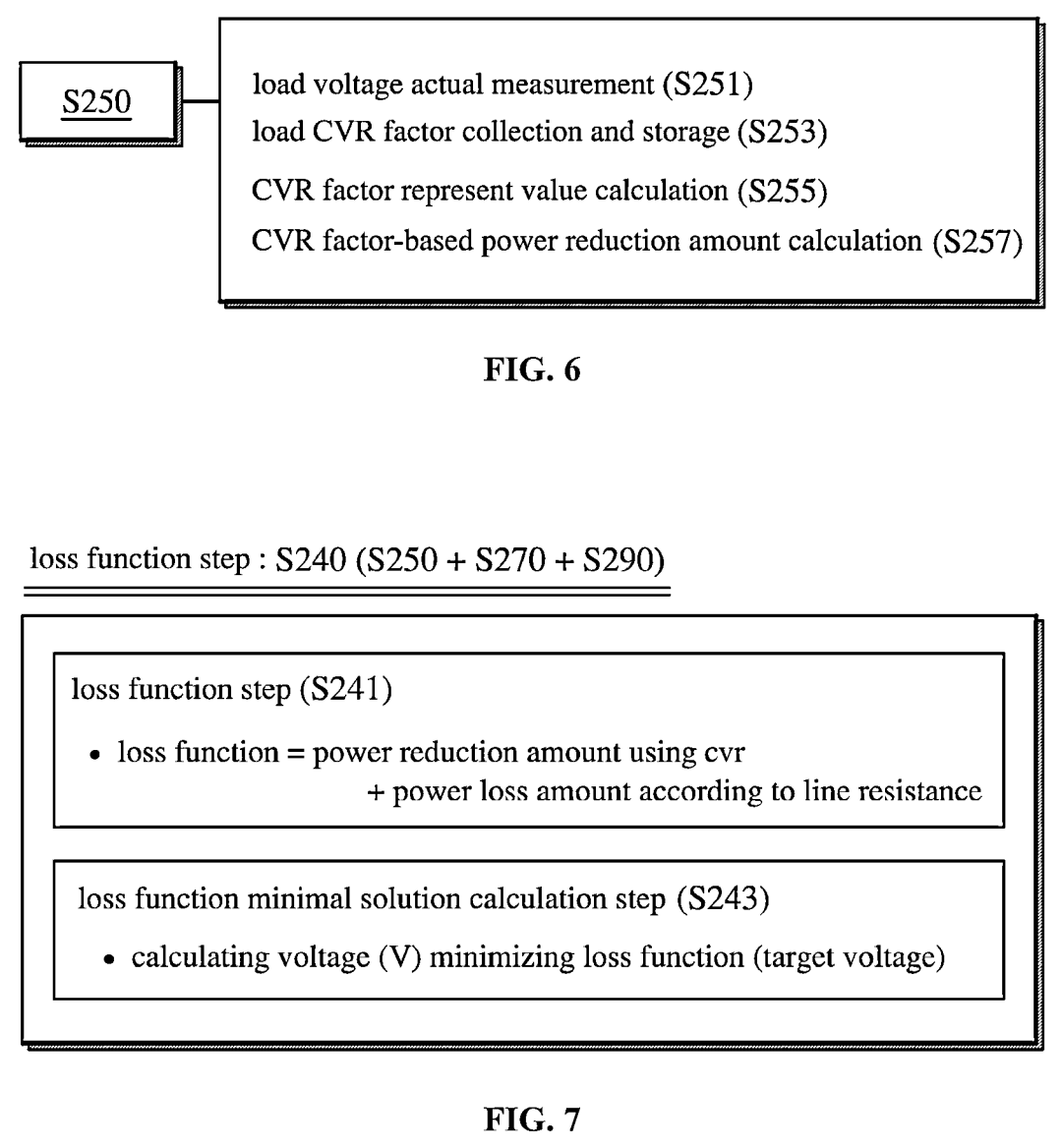

| S250 | load voltage actual measurement (S251) |
|------|----------------------------------------|
| | load CVR factor collection and storage (S253) |
| | CVR factor represent value calculation (S255) |
| | CVR factor-based power reduction amount calculation (S257) |

FIG. 6 loss function step : S240 (S250 + S270 + S290)

loss function step (S241)

- loss function = power reduction amount using cvr
  + power loss amount according to line resistance loss function minimal solution calculation step (S243)

- calculating voltage (V) minimizing loss function (target voltage)

FIG. 7

VOLTAGE CONTROL DEVICE AND VOLTAGE CONTROL METHOD CONSIDERING POWER LOSS DUE TO LINES

CROSS REFERENCE TO RELATED APPLICATION AND CLAIM OF PRIORITY

This application claims the benefit under 35 USC $119 of Korean Patent Application No. 10-2023-0068010 filed on May 26, 2023, in the Korean Intellectual Property Office (KIPO), the entire disclosure of which is incorporated herein by reference for all purposes.

BACKGROUND

1. Field of the Invention

The present disclosure relates to a voltage control device and method considering a power loss due to lines in the process of controlling the voltage of a voltage regulator that is supplied to loads using conservation voltage reduction (CVR), etc.

2. Description of the Related Art

Conservation Voltage Reduction (CVR) may be used as one of energy reduction technologies including energy consumption reduction and peak load reduction for efficiently and stably supplying power.

In the related art, a power exchange or a power plant that is in charge of supplying power to a power system or controlling power one-sidedly applies CVR to customers in most cases due to reasons of a power peak, etc. However, recently, it is increasingly required to apply CVR around a node of a power receiving system due to the advent of new power sources for systems, including the sunlight or V2G.

Further, since the grids continuing from the upstream side to the loads at the downstream side in a power system are more and more complicatedly distributed and the power delivery distance is increased, it is required to consider a power loss amount due to a line loss in addition to a voltage drop due to CVR in order to optimally control a load voltage.

SUMMARY

The present disclosure can set a loss function and calculate a target voltage using the loss function as a minimal solution to solve the problem that when a voltage drops due to the effect of conservation voltage reduction (CVR), a power loss amount according to line resistance increases due to an excessive voltage drop and accordingly the power reduction effect decreases.

Further, the present disclosure is intended to control a load at an optimal target voltage on the basis of power reduction according to a voltage drop by a CVR effect or a power loss amount due to line resistance when power is supplied to a node (load) within an allowable power range, thereby being able to provide an optimal reduction charge or a corresponding charge reduction report.

A voltage control device of the present disclosure may include: a voltage control module being able to regulate a voltage that is supplied to a load or is transmitted backward from a load; a power loss predictor predicting or calculating a power loss amount due to a line of a power system; and a cooperative controller giving the target voltage to the voltage regulation module, in which the cooperative controller can set sets a loss function that is used to calculate the target voltage.

A voltage control method may include: a data collection step in which power data of a voltage regulation module, which is configured to regulate a voltage that is supplied to a load or is transmitted backward from a load, are transmitted to a data collector; a target voltage calculation step of calculating a target voltage to be regulated of the voltage regulation module; and a voltage control step of controlling the voltage regulation module at a target voltage or giving the target voltage to the voltage regulation module, in which the target voltage calculation step may include a loss function step of setting a loss function that is used to calculate the target voltage and of finding a solution of the loss function.

The present disclosure may set loss function including a component that gives a voltage drop function due to CVR or gives a voltage rise effect due to a power loss amount according to line resistance. When the loss function is a function for a voltage or a voltage difference, it is possible to obtain a target voltage of a voltage regulation module that is a voltage regulation object by finding a solution that minimizes or maximizes the loss function.

The present disclosure can regulate power, which is supplied to a node facility (load facility) to use a CVR effect in consideration of a line loss from a voltage control module to a load while maintaining a lowest voltage within an allowable power range of the node facility (load facility) when controlling power that is supplied to a load.

Further, the present disclosure can predict or control a voltage that is supplied to a load in consideration of a power loss amount according to line resistance as a power system is complicated due to transmission of power backward to the upstream side of a power system as a distributed power unlike existing loads that only consume power at the downstream side of a power system. As a result, it is possible to provide an optimal charge reduction effect to an owner or a manager of a node (load).

BRIEF DESCRIPTION OF THE DRAWINGS

The above and other objectives, features and other advantages of the present invention will be more clearly understood from the following detailed description when taken in conjunction with the accompanying drawings, in which:

FIG. 3 is a configuration view of a voltage control method of the present disclosure;

FIG. 6 is a configuration view of a first voltage calculation step of the present disclosure;

FIG. 7 is a view illustrating a loss function step of the present disclosure.

DETAILED DESCRIPTION OF THE INVENTION

Figure 1:
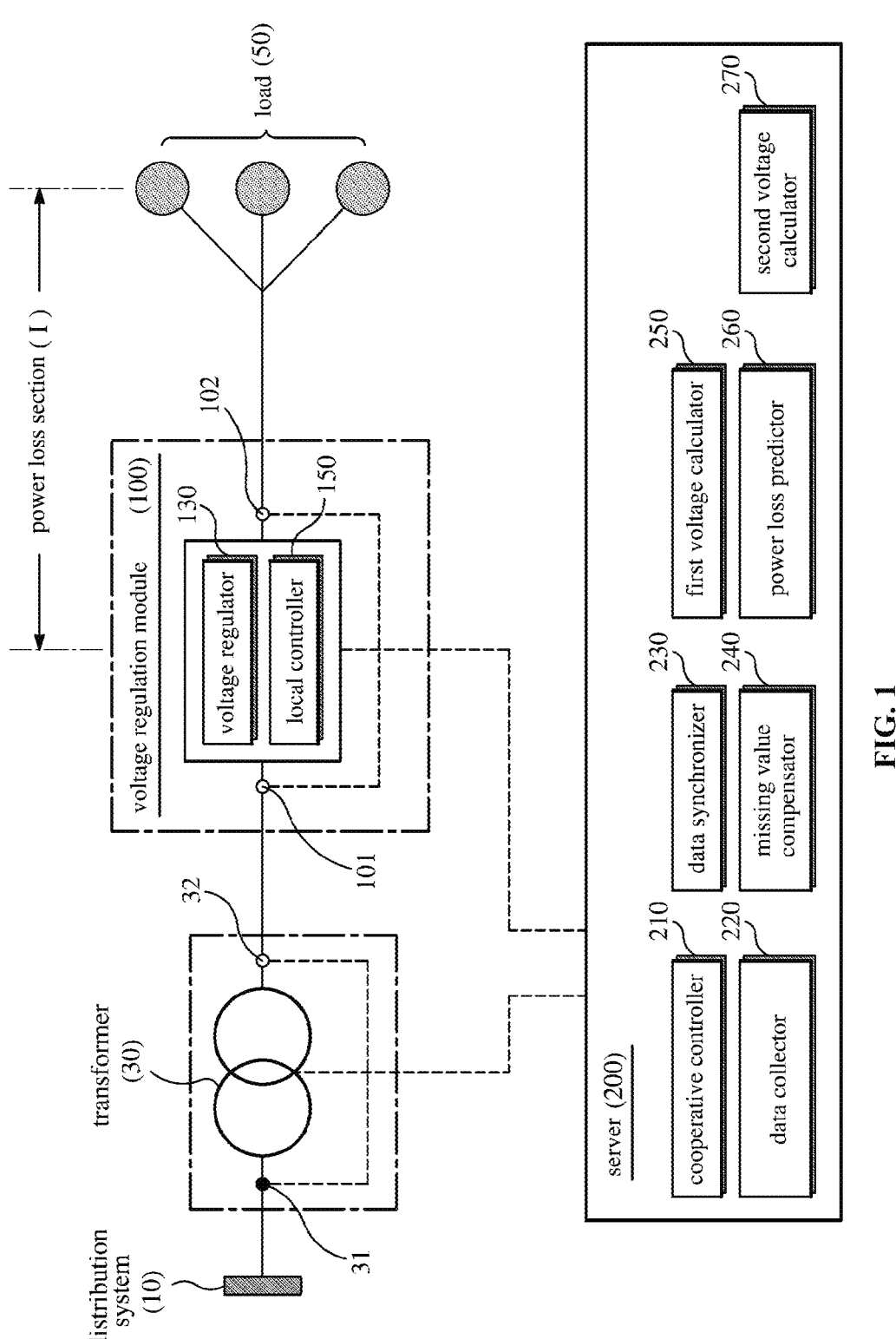
FIG. 1 is a structural view of a voltage control device of the present disclosure.

A voltage control device and a voltage control method of the present disclosure are described with reference to FIGS. 1 to 8.

Setting a loss function by a cooperative controller 210 of a voltage control device of the present disclosure and a loss function step S240 of a voltage control method of the present disclosure are described first with reference to FIGS. 3 and 7.

In the loss function step S240, the cooperative controller 210 can set a loss function showing a power reduction amount or a power loss amount for a voltage regulation module 100 that is a voltage regulation object or a load 50 connected to the voltage regulation module 100.

A target voltage calculation step S200 that calculates the target voltage to be regulated of the voltage regulation module may include the loss function step S240. The loss function step S240 may include a loss function forming step S241 or a loss function minimal solution calculation step S243.

The loss function forming step S241 may be a step in which a loss function, which includes a first component corresponding to a power reduction amount using Conservation Voltage Reduction (CVR) or a second component corresponding to a power loss amount according to line resistance, is set or formed by the cooperative controller 210.

The loss function minimal solution calculation step S243 finds a minimal solution that is called a loss function and minimizes a power loss to emphasize the respect of considering a voltage rise by a line power loss when a voltage drops by CVR of the present disclosure, but a loss function may be configured to show a power reduction amount in an operator's side, and in this case, it may be an objective to find a solution that maximizes power reduction amount.

Accordingly, regardless of the name, the loss function or loss function minimal solution calculation step S243 may be configured to show a power loss amount and may include finding a solution that minimizes a power loss, or may be configured to show a power reduction amount and may include finding a solution that maximizes power reduction, or may include finding local maxima or local minima, and as a result, it is the same in all of the cases that it is intended to provide a target voltage that can reduce a power charge to the subject that operates the voltage regulation module.

The loss function step S240 may include at least one of a first voltage calculation step S250, a power reduction prediction step S270, and a second voltage calculation step S290 to be described below. The matters about the first voltage, the power loss amount by a line loss, or the second voltage can be applied also to the loss function step S240. In more detail, the loss function forming step S241 may include at least one of the first voltage calculation step S250, the power reduction prediction step S270, and the second voltage calculation step S290.

The first component corresponding to a power reduction amount using CVR of the loss function may correspond to a voltage drop of the first voltage of the first voltage calculation step S250. The second component of the loss function may correspond to the power reduction amount according to line resistance. The first component or the second component may be given as a function for a voltage or a voltage difference due to a voltage drop.

For example, the first component may be given as a linear function for a voltage or a voltage difference related to the voltage regulation module 100 and the second component may be given as a quadratic function for a voltage or a voltage difference related to the voltage regulation module 100. In this case, a loss function may be expressed as a quadratic polynomial for a voltage or a voltage difference related to the voltage regulation module 100, whereby minimizing the power charge of the voltage regulation module 100 that is a voltage regulation object may be the same as finding minima, maxima, or local solutions of the loss function expressed as a polynomial for the voltage or the voltage difference.

A loss function is obtained by adding a voltage rise effect (second component) considering a line power loss amount to a power reduction amount due to the voltage drop effect of CVR (first component), so a loss function may mean a corrected power reduction amount.

A Conservation Voltage Reduction (CVR) factor (or CVRf) may mean the rate of change of power to the rate of change of voltage. For example, when a voltage changes 1% in the same direction and power changes 2%, a CVR factor may be 2.

The power reduction amount due to CVR (first component, $\Delta P$) may be calculated by multiplying a voltage difference $\Delta V$ by a CVRf (CVR factor). A CVR factor may be set as a constant that is set in advance such as an average value from power data of the voltage regulation module 100, so the power reduction amount due to CVR (first component) may be proportioned to a voltage difference $\Delta V$ or may be determined by a voltage difference $\Delta V$.

For example, a voltage difference $\Delta V$ of the power reduction amount due to CVR (first component) may mean the difference ($\Delta V = |V\_current - V\_target|$) between a current voltage (V_current) and a target voltage (V_target).

Accordingly, the power reduction amount due to CVR (first component) may be determined by or may depend on a linear expression or a first order of a voltage (e.g., a target voltage) or a voltage difference (e.g., the difference between a current voltage (V_current) and a target voltage (V_target)).

In this case, the voltage difference $\Delta V$ may voltage variation at different points in time at the same measurement point that is a voltage regulation object of the voltage regulation module 100. That is, the voltage difference $\Delta V$ may correspond to voltage variation at different points in time before and after voltage variation for the same voltage regulation module 100 that is a voltage regulation object.

A line power loss amount (a power loss amount due to line resistance or a second component) may be a power loss amount from the voltage regulation module 100 to a power supply point connected along a line of a power system.

For example, the power supply point may include a load 50 that consumes power, and in this case, the line power loss amount (second component) a power loss amount due to a line length (resistance) from the voltage regulation module 100 (in more detail, a measurement point of the voltage regulation module) to the load 50.

When it diverges into multiple steps of an upstream voltage regulation module 110 and a downstream voltage regulation module 120, the power supply point may include another voltage regulation module 110 or 120 or the load 50. In this case, another voltage regulation module 110 or 120 may include a measurement point of the voltage regulation module, which may mean that the measurement point is provided on a corresponding line through which power is supplied. A final power supply point would be the load 50, but in a multi-level power supply module structure in which a power system diverges, the upstream voltage regulation module 110 or the downstream voltage regulation module 120 can function as an intermediate power supply point.

For example, a line power loss amount (second component, $\Delta P$) may be calculated by (voltage difference $\Delta V)^2/R$ (R is line resistance. A voltage difference $\Delta V$ of the line power loss amount (second component) may mean the difference between the voltage of the voltage regulation module 100 and the voltage (V_object) of the power supply point. The power supply point may include, as described above, the load 50 or another voltage regulation module 100.

The voltage of the voltage regulation module 100 of the second component may include a target voltage (V_target) to be expected and regulated by the voltage regulation module 100 of the present disclosure.

For example, the voltage difference ΔV of the second component may be calculated from the difference between the target voltage (V_target) and the voltage (V_object) of a power supply point (ΔV=|V_target−V_object|). Accordingly, the line power loss amount (second component) may be determined by or may depend on a square (quadratic) of a target voltage or a square (quadratic) of a voltage difference ΔV to which a target voltage has been reflected.

In this case, the voltage difference ΔV of the second component may be voltage variation between different points (e.g., a voltage regulation module or a measurement point thereof and a load) at the same point in time. Further, the target voltage (V_target) at the second component may be a voltage for a measurement point disposed in a line considering a loss of measurement points 101 and 102 of a voltage regulation module.

As described above, a loss function can be expressed as various polynomials including a quadratic for a voltage (target voltage) or a voltage difference including a target voltage, and as a result, calculating an optimal/minimum operation charge may correspond to finding a solution of a loss function that may be various quadratics.

A voltage control device of the present disclosure is described with reference to FIGS. 1 and 2.

Figure 2:
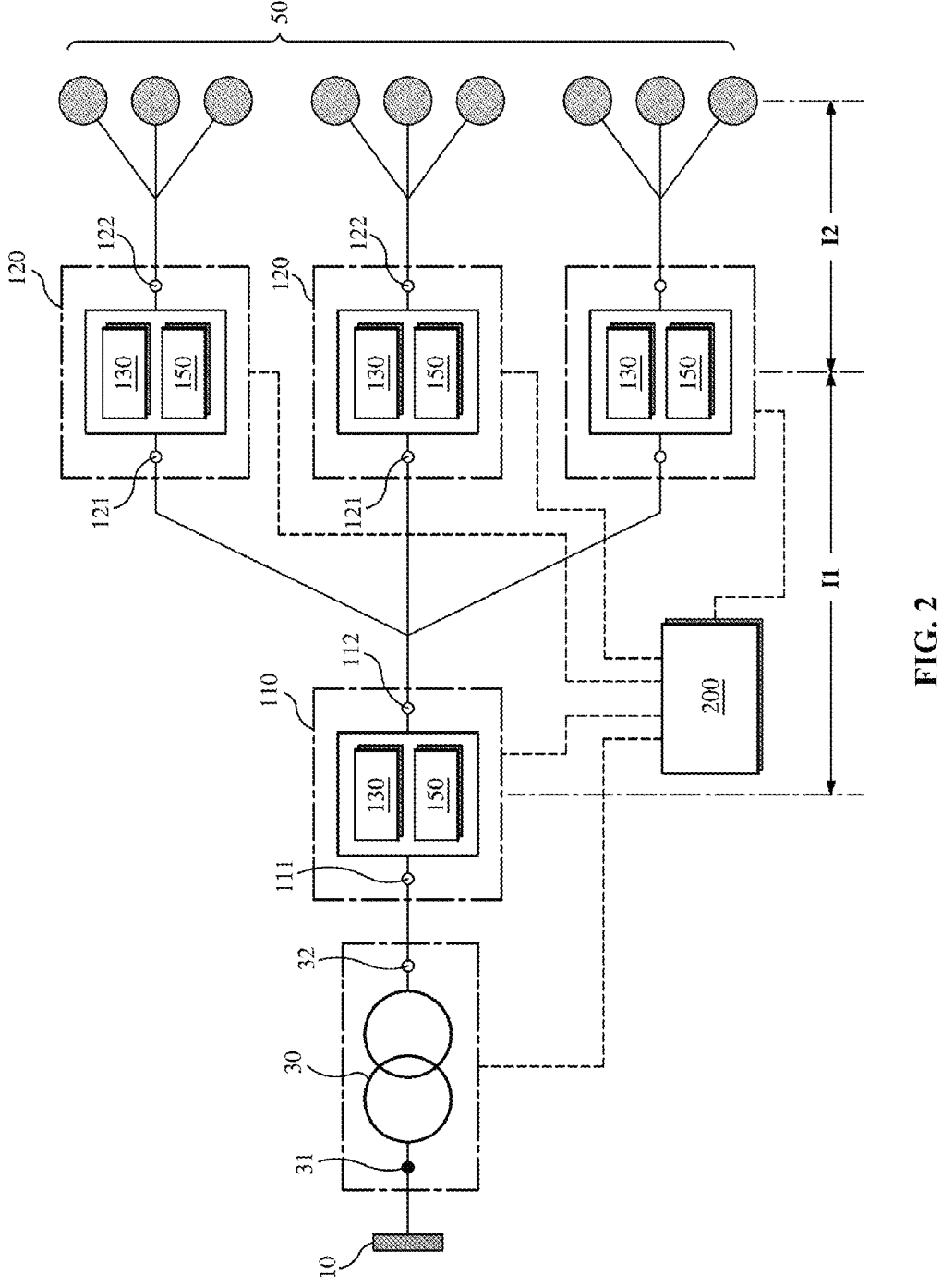
FIG. 2 is an embodiment of FIG. 1.

FIG. 1 may illustrate a fundamental unit structure of the voltage control module 100 of the present disclosure disposed between a transformer 30 and a load 50 in a power system or a distribution system 10 and FIG. 2 may illustrate an embodiment of a plurality of voltage regulation modules 100 in a power system diverging in multistage hierarchies.

Voltage control or voltage regulation is shown at the downstream side of the distribution system 10 as the meaning that it is performed in a region adjacent to the load 50 in FIGS. 1 and 2, but a distribution relay, a power system, and a grid may be used together with each other for convenience, depending on situations.

The load 50 may include not only, as the original meaning, a power consumption subject that consumes power including an industrial facility, such as an electric motor and an electric melting furnace, or a lighting, an office machine, and a home appliance, but also a power supply object that can transmit electricity to the power system 10 as a distribution power source such as the sunlight, an electric vehicle charger, and an ESS. The load 50 may be referred to as a node in that it can diverge in multistage hierarchies, as in FIG. 2.

The voltage control device of the present disclosure may include a voltage regulation module 100 installed in the power system 10 and being able to regulate a voltage that is supplied to the load 50 or transmitted back from the load 50, or a server 200 remotely transmitting/receiving power data to/from the voltage regulation module 100.

In this case, the power data of the voltage regulation module 100 may include data related to voltage that is input to or output from the voltage regulation module 100 or power data related to the load 50 positioned at the downstream side of the voltage regulation module 100.

Further, the power data may include all of not only power having the general meaning of a product of a current and a voltage, but also data that are generated by flow of electricity such as a voltage, a current, resistance, a shift point in time of a voltage regulation device, reactive power, and a power factor.

The voltage regulation module 100 may include at least one of a voltage regulator 130, a local controller 150, and measurement points 101 and 102.

The voltage regulator 130 may receive an optimal target voltage from the server 200 or the cooperative controller 210. The target voltage that is given to the voltage regulator 130 may be set differently for each voltage regulator 130 in accordance with disposition of the load 50 at the downstream side or the diverging structure of the load 50.

In the specification, "optimal" may mean that it is possible to reduce an electricity charge as much as possible by maximally reducing power or electricity in the position of an operator or a manager.

At the measurement point 101 or 102 of the voltage regulation module 100, power data that are input to the voltage regulation module 100 from the outside or power data that are output to the outside from the voltage regulation module 100 can be measured.

The measurement point 101 or 102 of the voltage regulation module 100, which is a position that is a voltage regulation object of the voltage regulation module 100, may be a point at which a predicted or calculated target voltage is achieved.

The measurement point 101 or 102 of the voltage regulation module 100, in terms of the concept, may be included in the voltage regulator 130 or may be installed separately from the voltage regulator 130.

In a structure in which a measurement point of the voltage regulation module 100 is installed at the voltage regulator 130, the measurement point may be installed at an input end or an output end of the voltage regulator 130. When a measurement point of the voltage regulation module 100 is installed separately from the voltage regulator 130, a sensor that can collect power data, etc. may be installed at the measurement point of the voltage regulation module 100.

Hereafter, the meaning of a voltage regulation object for measurement points 31 and 32 of the transformer 30 or the measurement points 101 and 102 of the voltage regulation module 100 may mean that when a measurement point is included in the voltage regulator 130 and included in an end, it becomes a direct voltage regulation object or that when a measurement point is installed at a predetermined distance from separately the voltage regulator 130, the voltage regulator 130 is controlled at a target voltage given by the cooperative controller 210 or the server 200 and an effect by the control is shown at the measurement point. Unless specifically stated, a measurement point will be described as the latter meaning, but may be expanded to the former meaning when the measurement point and the voltage regulator 130 are not clearly discriminated.

A measurement point of the voltage regulation module 100 may include a first measurement point 101 or a second measurement point 102. In the power system or the distribution system 10, the first measurement point 101 may be at the upstream side of the voltage regulation module 100 and the second measurement point 102 may be at the downstream side of the voltage regulation module 100.

A local controller 150 can change into a local automatic operation mode 140 when communication between the voltage regulation module 100 and the server 200 is disconnected in a communication connection state checking step S120. In the local automatic operation mode S140, the local controller 150 can locally operate the voltage regulation module 100 in which the local controller 150 is installed while communication is disconnected.

When changing into the local automatic operation mode S140 due to disconnection of communication with the server 200, the local controller 150 can determine the position of a measurement point at which a voltage is to be regulated by determining a transmission direction of power flowing to a corresponding voltage regulation module 100.

As an embodiment, when a power factor is a positive number from power data of a corresponding voltage regulation module 100, the local controller 150 can determine that a power direction is a forward direction (from the first measurement point 101 to the second measurement point 102), and when a power factor is a negative number, the local controller 150 can determine that a power direction is a backward direction (from the second measurement point 102 to the first measurement point 101).

When a measurement point that is a voltage regulation object is determined, the local controller 150 can regulate the voltage at the measurement point to a preset reference voltage or reference value or can discontinue or stop voltage regulation performed already or to be performed for the measurement point.

Controlling a voltage to a preset reference voltage or stopping voltage regulation by the local controller 150 may depend on the kind of the load 50.

When the load 50 disposed at the downstream side of the voltage regulation module 100 that is a voltage regulation object is a type that only consumes power, the local controller 140 can regulate the voltage of the second measurement point 102 to a preset reference voltage when determining forward transmission due to reasons such as the case in which a power factor is a positive number, etc. and can stop voltage regulation for the second measurement point 102 when determining backward transmission due to reasons such as the case in which a power factor is a negative number, etc.

A power drop due to CVR or a power loss amount due to line resistance may be reflected to the preset reference voltage.

When the load 50 disposed at the downstream side of the voltage regulation module 100 that is a voltage regulation object is a type that only transmits power backward due to reasons such as power production or charging, the local controller 140 can stop voltage regulation measurement point 102 when determining forward transmission due to reasons such as the case in which a power factor is a positive number, etc. and can regulate the voltage of the first measurement point 101 to a preset reference voltage when determining backward transmission due to reasons such as the case in which a power factor is a negative number, etc. In this case, a power loss amount due to line resistance is reflected, whereby the voltage of the first measurement point 101 may rise.

When the load 50 disposed at the downstream side of the voltage regulation module 100 that is a voltage regulation object is a type that consumes power and also can perform backward transmission due to reasons such as power production or charging, the local controller 150, during disconnection of communication with the server 200, can stop voltage regulation for the first measurement point 101 and can regulate the voltage of the second measurement point 102 to a reference voltage when determining forward power transmission, and can regulate the voltage of the first measurement point 101 to a preset reference voltage and can stop voltage regulation for the second measurement point 102.

The upstream or downstream side is not based on the flow of power and may a divergent structural meaning of the power system 10 from a power supplier, such as Korea Electric Power Corporation, to the load 50 at the end. This is because the load 50 of the present disclosure includes a component not only consuming power, but being able to supply power back to the power system 10 like a distributed power.

Accordingly, the first measurement point 101 may be also referred to as an upstream measurement point, a measurement point positioned at an upstream side, an upstream measurement point of the voltage regulation module 100, etc., and the second measurement point 102 may be also a downstream measurement point, a referred to as measurement point positioned at downstream side, a downstream measurement point of the voltage regulation module 100, etc.

Figure 4A:
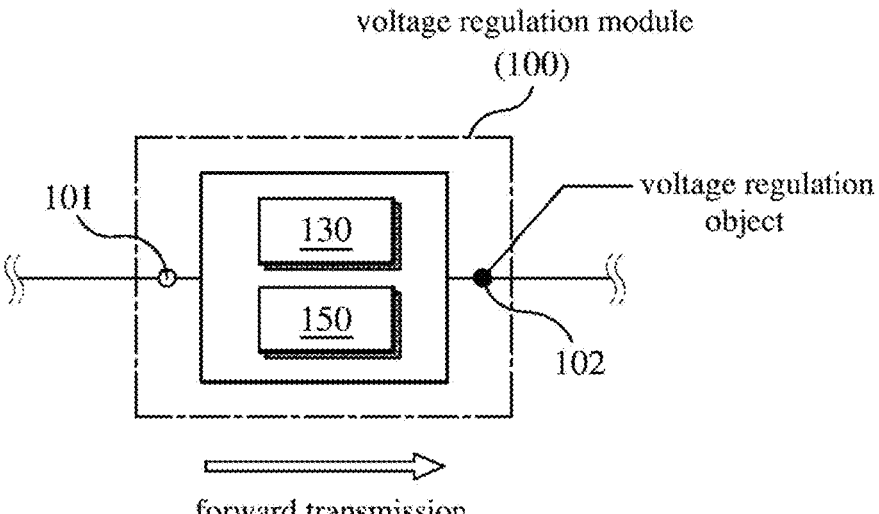
FIGS. 4A and 4B are views illustrating a measurement point of a voltage regulation module of the present disclosure that is a voltage regulation object according to flow of power.
Figure 4B:
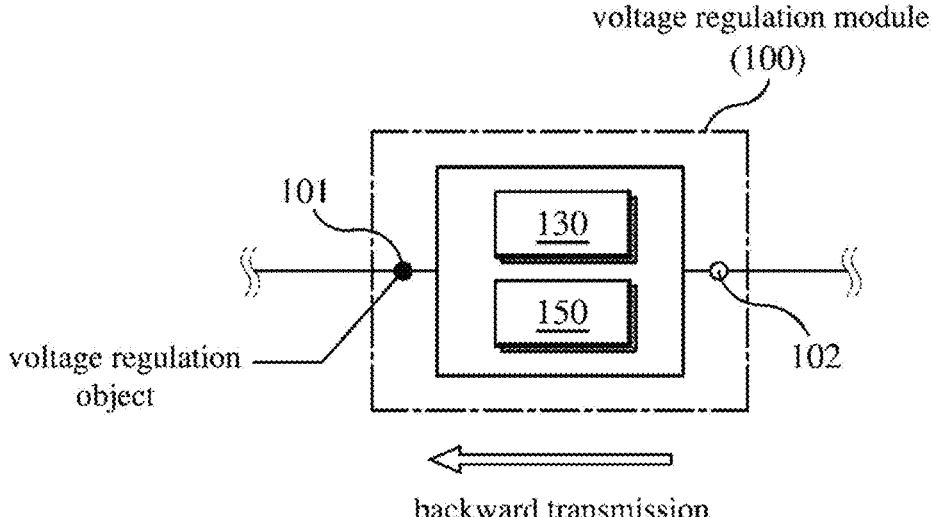

Referring to FIGS. 4A and 4B, when forward power is transmitted from the upstream side to the downstream side of the power system 10, the second measurement point 102 may be a voltage regulation object by the voltage regulation module 100. On the contrary, when backward power is transmitted from the downstream side to the upstream side of the power system 10, the first measurement point 101 may be a voltage regulation object by the voltage regulation module 100.

Accordingly, a measurement that is necessarily required may depend on the kind of the load 50.

When only a load 50 that only consumes power is disposed at the downstream side of the voltage regulation module 100, just the second measurement point 102 that is a voltage regulation object is enough.

On the other hand, a load 50 including a new renewable energy generation that supplies power to the power system 10 such as a solar generation source and a wind generation source is disposed at the downstream side of the voltage regulation module 100, just the first measurement point 101 may be enough.

Further, when a load 50 that needs to collect power data about forward power transmission and backward power transmission and to control power such as an electric vehicle charger is disposed at the downstream side of the voltage regulation module 100, the first measurement point 101 or the second measurement point 102 may be included.

The description about the measurement points may be based on that information about power data that are input or power data that are output may be collected in the voltage regulator 130 in addition to the measurement points and the collected information may be transmitted to the server 200. When there is no function of collecting power data that are input or output in the voltage regulator 130 or transmitting data, the first measurement point 101 and the second measurement point 102 both may be necessary components. This is because a voltage that is output with respect to a voltage that is input to the voltage regulator 130 is regulated to be a target voltage, so a comparative object is needed.

The first measurement point 31 of the transformer 30 may be disposed at the upstream side of the transformer 30 or the second measurement point 32 may be disposed at the downstream side of the transformer 30.

The transformer 30 in the present disclosure may mean a substation facility in the case in which high-voltage electricity that is supplied from Korea Electric Power Corporation is supplied to a load 50, such as a house or a facility, through several steps of substation facilities. That is, the transformer 30 shown in the figures may mean a substation facility as a public facility rather than an object that is controlled by the voltage control device of the present disclosure.

The meanings and expressions of the measurement points 101 and 102 of the voltage regulation module 100 may be equally applied to the measurement points 31 and 32 of the transformer 30. However, the measurement points 31 and 32 of the transformer 30 may be distinguished from the measurement points 101 and 102 of the voltage regulation module 100 in that the measurement points 31 and 32 are not voltage regulation objects by a target voltage of the present disclosure.

The measurement points 31 and 32 of the transformer 30 are not objects of which the voltage is regulated to a target voltage by the cooperative controller 210, but power data at the measurement points 31 and 32 of the transformer 30 can be collected and transmitted to the server 200 or the cooperative controller 210.

The measurement points 31 and 32 of the transformer 30 may be reference points for data synchronization S210 of power data before comparison or analysis of the voltage regulation module 100 positioned at the downstream side of the transformer 30.

In particular, the first measurement point 31 of the transformer 30 can be used as a reference point of the data synchronization step S210. Since a potential transformer (PT) that can be shared is provided at the primary side of a transformer in common substation facilities, it is possible to simply form the first measurement point 31 that is an upstream measurement point of the transformer 30 by connecting a wire or attaching a sensor to a PT of a transformer.

Accordingly, measurement points that are voltage regulation objects in FIGS. 4A and 4B are the measurement points 101 and 102 of the voltage regulation module 100, so the measurement points 31 and 32 of the transformer can be excluded.

The voltage control device and the voltage control method of the present disclosure can consider a power reduction amount S250 due to CVR or a line loss S270 according to line resistance to calculate a target voltage that can reduce a charge as much as possible.

A line loss that is considered to calculate a target voltage may be related to a power loss section I between the voltage regulation module 100 and the load 50.

When the load 50 connected at the downstream side of the voltage regulation module 100 that is a control object consumes power, the power loss section I may be from the voltage regulation module 100 to the load 50 connected at the downstream side thereof. In this case, the voltage regulation object to be regulated to a target voltage may be the second measurement point 102 that is a downstream measurement point of the voltage regulation module 100 and the power loss section I, in more detail, may be the line section from the second measurement point 102 to the load 50.

A line power loss of a power loss predictor 260 may be related to a power loss section corresponding to at least a portion of a line of a distribution system or a power system.

In this case, power reduction (first voltage) due to CVR or a power loss amount due to a line loss may be applied to the second measurement point 102.

Power reduction due to CVR may be to decrease a voltage to a voltage (first voltage) close to a V lower limit that is a lower limit of an allowable range within the power allowable range (or allowable range) of the load 50 at the downstream side.

Figure 5A:
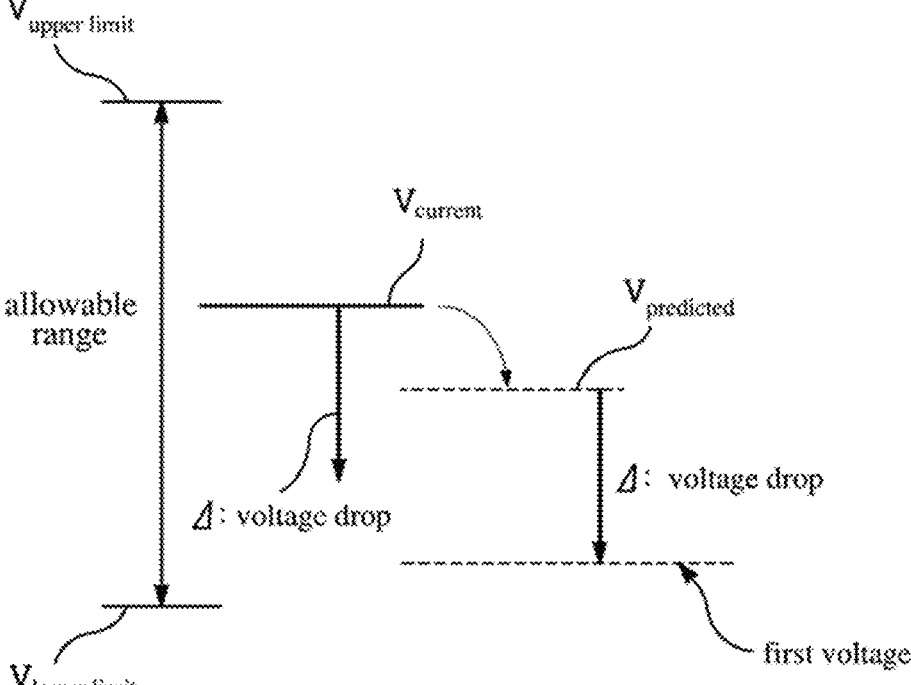
FIGS. 5A and 5B are views illustrating a first voltage and a second voltage of the present disclosure.
Figure 5B:
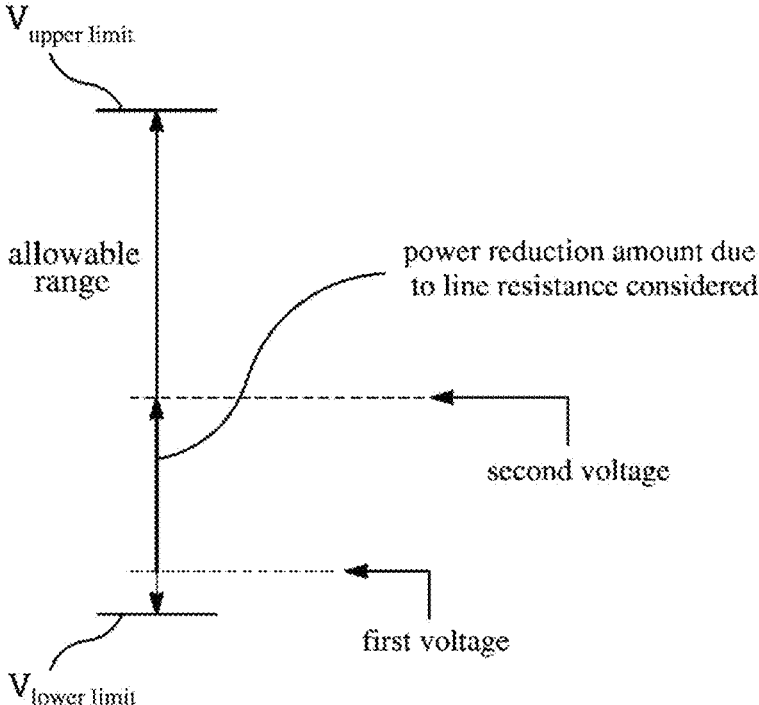

Referring to FIGS. 5A and 5B, since a power loss amount due to line resistance is proportioned to a square of a voltage, the larger the voltage, the larger the power loss amount may be, so the larger the voltage drop due to CVR, rather the larger the power loss amount, and accordingly, the entire power reduction effect or charge reduction effect may decrease.

Accordingly, considering a power loss amount due to line resistance, it may be the same as calculating a corrected voltage (second voltage) by adding a voltage rise effect by consideration of a power loss amount due to line resistance to a voltage drop (first voltage) considering power reduction due to CVR.

When a load 50 consumes power, the second measurement point 102 is a voltage regulation object and a voltage drop considering power reduction due to CVR or a voltage rise by consideration of a power loss amount due to line resistance may be applied.

Power supplied to the upstream side of the voltage regulation module 100 connected to a load 50 that functions as a distributed power source can be supplied to another voltage regulation module 100 connected with a load 50 that needs power supply.

Accordingly, when a load 50 connected at the downstream side of the voltage regulation module 100 that is a control object supplies power back to the power system 10, the power loss section I may mean the section from a first voltage regulation module to the load 50 through another second voltage regulation module. In more detail, the power loss section I may be the section from the first measurement point 101 of a first voltage regulation module to a load 50 positioned at the downstream side of another second voltage regulation module.

When the load 50 transmits power backward to the power system 10, a voltage rise for reducing a power loss amount according to line resistance may be applied to the first measurement point 102. In this case, a voltage drop considering power reduction due to CVR may not be considered for the first measurement point 102.

When the load 50 performs both of power consumption and power supply, the power loss section I may be the section from the voltage regulation module 100 to the load at the downstream side thereof when forward power is transmitted, and may be the section from the voltage regulation module 100 to a load 50 positioned at the downstream side of another voltage regulation module 100 when backward power is transmitted.

In this case, the voltage regulation module 100 has both first measurement point 101 and the second measurement point 102 as voltage regulation objects, in which a voltage drop considering power reduction due to CVR or a voltage rise by consideration of a power loss amount due to line resistance may be applied to the second measurement point 102, and, for the first measurement point 101, a voltage rise for reducing a power loss amount according to line resistance may be applied and the voltage drop considering power reduction due to CVR may not be considered.

Referring to FIG. 2, when a power system complicatedly diverges, the voltage regulation module 100 may be divided into multiple steps. The voltage regulation module 100 may include an upstream voltage regulation module 110 or a downstream voltage regulation module 120. For the upstream side or the downstream side, the same as the description about the measurement points, those in the diverging structure of the power system can be commonly applied.

A voltage regulation object of the upstream voltage regulation module 110 is the second measurement point 112 of the upstream voltage regulation module 110 in the figures, but FIG. 2 shows a brief embodiment of a multi-step structure, when a power system complicatedly diverges, the first measurement point 111 of the upstream voltage regulation module 110 may also be a voltage regulation object by backward transmission.

Voltage control of the upstream voltage regulation module 110 may be determined in consideration of voltage control of the downstream voltage regulation module 120 positioned at the downstream side thereof. When a voltage rise is predicted at a first downstream voltage regulation module but a voltage drop is predicted at another second downstream voltage regulation module, voltage control of the upstream voltage regulation module 110 may depend on the degrees of a voltage drop and a voltage rise of the two downstream voltage regulation modules.

The server 200 can receive power data from the upstream voltage regulation module 110 or the downstream voltage regulation module 120 and can transmit a calculated or predicted target voltage. In voltage control of the upstream voltage regulation module 110, not only when information of the downstream voltage regulation modules 120 positioned at the downstream side thereof is needed, but when one of the voltage regulation modules 120 is connected with a load 50, power data of another downstream voltage regulation module may be used to determine the degree of a voltage to be raised of a corresponding downstream voltage regulation module 120.

When the voltage regulation module 100 is composed of upstream/downstream multistage hierarchies, the power loss section I may also be divided into multistage hierarchies. In this case, the power loss section I may include a first power loss section I1 and a second power loss section 12.

The first power loss section I1 may be the section from the upstream voltage regulation module 110 to the downstream voltage regulation module 120.

When there is a load 50 that consumes power, the second power loss section 12 may be the section from the downstream voltage regulation module 120 to the load 50 connected at the downstream thereof. Further, when there is a load 50 that transmits power backward, the second power loss section 12 may be the section from the first downstream voltage regulation module 120 to a load 50 connected to another second downstream voltage regulation module 120 through the second downstream voltage regulation module 120.

When a load 50 that can perform both of power consumption and power backward transmission is connected to the first downstream voltage regulation module 120, the second power loss section 12 may be the section from the first downstream voltage regulation module 120 to the load 50 connected at the downstream side thereof when forward power is transmitted to the first downward voltage regulation module 120, and may be the section from the first downstream voltage regulation module to a load connected to a second downstream voltage regulation module through the second downstream voltage regulation module when backward power is transmitted to the first downstream voltage regulation module.

Considering the downward voltage regulation module 120 and the loads 50 connected thereto, a voltage drop considering CVR and a voltage rise considering a line power loss amount considering the first power loss section I1 and the second power loss section 12 may be both applied to the second measurement point 112 of the upstream voltage regulation module 110.

The concentration degrees of a voltage drop considering CVR and a voltage rise according to a line loss may be different at each voltage regulation module hierarchy in accordance with a diverging structure of a power system, the distance between voltage regulation modules 100, the distance between a voltage regulation module 100 and a load 50, or the like. For example, a voltage rise according to a line loss may be more concentrated at the upstream voltage regulation module 110 and a voltage drop considering CVR may be more concentrated at the downstream voltage regulation module 120.

The voltage control device of the present disclosure may include at least one of a cooperative controller 210, a data collector 220, a data synchronizer 230, a missing value compensator 240, a first voltage regulator 250, a power loss predictor 260, and a second voltage calculator 270.

The data collector 220 can receive and collector or store power data from the transformer 30 (including the measurement points 31 and 32) or the voltage regulation module 100 (including the measurement points 101 and 102, the voltage regulator 130, and the local controller 150).

Power data that are collected from the transformer 30 or the voltage regulation module 100 may be collected in a basic unit such as time-series second, minute, hour, etc.

A great amount of power data of the transformer 30 or the voltage regulation module 100 that can be collected even in the unit of second may be used for calculation or prediction based on artificial intelligence such as machine learning of the present disclosure at the first voltage calculator 250, the power loss predictor 260, the second voltage calculator 270, a predicted voltage (V_predicted) calculator (when it is separately from the cooperative controller), or the like. Accordingly, a target voltage of the voltage regulation module 100 of the present disclosure can be calculated in real time, and corresponding reduction charge calculation S400 or a charge reduction report may also be performed or made and provided in real time S500.

The cooperative controller 210 can give an instruction to each voltage regulation module 100 so that a voltage is regulated to the target voltage calculated using the power data of the data collector 220.

The cooperative controller 210 can calculate a predicted voltage (V_predicted) of each voltage regulation module 100 or loads 50 connected to the voltage regulation modules 100 on the basis of the power data of the data collector 220. A predicted voltage calculator that calculates a predicted voltage by figuring out a variation tendency from up-to-date past power data may be separately provided.

The present disclosure may be based on a predicted voltage (V_predicted) calculated by the cooperative controller 210 or the predicted voltage calculator to calculate a target voltage reflecting a voltage drop or a voltage rise of the voltage regulation module 100 (or the measurement points 101 and 102).

The voltage control device of the present disclosure can achieve voltage stabilization by predicting a future voltage to minimize a loss due to a low voltage and an excessive voltage that are generated by voltage regulation based on a current voltage.

The voltage control device of the present disclosure estimates a future voltage pattern by predicting the voltage of each node (load 50) and then estimates a target voltage due to a voltage drop or a voltage rise, and finally, the cooperative controller 210 can control the voltage regulator 130 at the target voltage.

FIGS. 5A and 5B show that, in the order of FIGS. 5A and 5B, a first voltage is calculated and a second voltage corrected by considering a power loss amount due to line resistance in the first voltage is calculated. This may relate to a target voltage of the second measurement point 102 of the voltage regulation module 100 when there is a load 50 that consumes power.

Depending on the kind of the load 50, it may be determined whether to apply only one or both of a voltage drop due to CVR by FIG. 5A and a voltage rise for reducing a line loss by FIG. 5B.

When the load 50 transmits power back to a power system, only the voltage rise for reducing a line loss by FIG. 5B would be applied to the first measurement point 101 of the voltage regulation module 100 without applying the voltage drop due to CVR by FIG. 5A.

In this case, a power loss amount due to a line loss may also be calculated on the basis of a predicted voltage (V_predicted). In this case, a second voltage is not corrected on the basis of a first voltage and may be a target voltage calculated in consideration of only a power loss amount due to line resistance.

When the load 50 can perform both of forward transmission and backward transmission, only a voltage rise for reducing a line loss may be applied to the first measurement point 101 of the voltage regulation module 100 without applying a voltage drop due to CVR, and the voltage drop due to CVR and the voltage rise for reducing a line loss by FIG. 5B may be both applied to the second measurement point 102.

The data synchronizer 230 can synchronize power data between voltage regulation modules 100 to calculate a target voltage using power data received from the power data received from the voltage regulation modules 100 including at least one of the measurement points 101 and 102, the voltage regulator 130, and the local controller 150.

When the load divergence structure at the downstream side of the voltage regulation module 100 that is a voltage regulation target is relatively simple, synchronization by the data synchronizer 230 may be omitted or may correspond to checking at the most, but recently, since the kinds of loads 50 are complicated for power consumption, backward transmission, a combination thereof, etc., the load divergence structure is also getting complicated. In this case, it may be required to synchronize power data before predicting power using power data or calculating/predicting power reduction or a power loss.

There is a need for a point that is a reference of power data synchronization, and the transformer 30 or the transformer measurement points 31 and 32 may be used. When a power system load divergence structure at the downstream side of the transformer 30 is not too complicated, it would be efficient to exchange power or store power using a facility such as an ESS within the downstream side of the transformer 30 rather than transmit power backward to the upstream side of the transformer 30, so it is possible to take the transformer 30 as a reference point of divergence and determine a data synchronization reference of a plurality of voltage regulation modules 100 at the downstream thereof.

Further, since a potential transformer PT that can be shared is provided at the primary side of a transformer in common substation facilities, there is an advantage in the position of a company, which operates the voltage control device of the present disclosure, that it is possible to simply collect power data of a transformer by connecting a wire and attaching a sensor to the primary side of the transformer. Accordingly, the first measurement point 31 that is an upstream side measurement point of the transformer 30 may be a reference point of data synchronization.

The data synchronizer 230 can primarily perform time synchronization according to time on power data collected from the transformer 30 or the voltage regulation module 100 and can secondarily perform phase synchronization on voltage data, etc. Time synchronization would be enough when the divergence structure of a power system is simple, but when a divergence structure is complicated, even though power data are synchronized, a time delay may be generated due to a fine change of a measurement point, etc., and accordingly, a phase delay between power data may be generated. In this case, secondary phase synchronization between power data may be needed.

The missing value compensator 240 can process a generated missing value or a blank value before predicting or estimating a target voltage, etc. using power data of the voltage regulation module 100. A missing value may include NA (Not Available), NaN (Not a Number), or Null.

The missing value compensator 240 can fill or replace a missing value through prediction or estimation using a machine learning model including a regression model, etc.

The missing value compensator 240 can estimate/predict a missing value from data excluding the missing value of power data of the voltage regulation module 100 having the missing value through learning or training, or can estimate/predict a missing value using power data of another voltage regulation module 200 excluding the power data of the voltage regulation module 100 having the missing value.

Processing a missing value by the missing value compensator 240 may be performed after power data are synchronized by the data synchronizer 230.

The first voltage calculator 250 can calculate a first voltage considering a power reduction amount by CVR.

Referring to FIGS. 5A and 5B, each load may have an allowable range out of which the possibility of reduction of lifespan or breakage increases. The first voltage calculator 250 can set a first voltage higher than a V_lower limit such that the first voltage is within an allowable range having a V_upper limit that is an upper limit and the V_lower limit that is a lower limit as boundary values.

The first voltage calculator 250 can calculate the degree of a voltage drop due to CVR on the basis of a predicted voltage (V_predicted) predicted or calculated by the cooperative controller 210 or the predicted voltage calculator.

The first voltage calculator 250 can drop a voltage directly from a current voltage (V_current) of the voltage regulation module 200 or can drop a voltage on the basis of a predicted voltage (V_predicted). When a voltage is dropped directly before a current voltage (V_current) of the voltage regulation module 100 rather than dropped in consideration of a predicted voltage (V_predicted), the possibility of a loss due to a low voltage or an excessive voltage decreases, so there is an advantage that a system can be more stably operated.

The power loss predictor 260 can predict or calculate a power loss amount due to a line from the voltage regulation module 100 to the load 50.

Power that is lost by a line may increase, depending on a voltage drop degree or a calculated first voltage. That is, the larger the voltage drop due to CVR, the more the power loss amount due to CVR, but the larger the voltage drop, the more the power loss amount due to line resistance, so an excessively large voltage drop may rather result in a decrease of power reduction.

Accordingly, there is a need that power reduction using CVR by the first voltage calculator 250 and a power loss amount according to a line by the power loss predictor 260 are harmonized.

The second voltage calculator 270 can calculate a second voltage that is a voltage corrected by considering a power loss amount of the power loss predictor 260 in the first voltage of the first voltage calculator 250.

Referring to FIGS. 5A and 5B, the first voltage calculator 250 can calculate a voltage drop or a first voltage that can reduce power as much as possible within an allowable power range without considering a line loss, the power loss predictor 260 can calculate a power loss amount due to line resistance from the voltage regulation module 100, which is a regulation object, to the load 50, and the second voltage calculator 270 can calculate a second voltage increasing a line power loss amount from the first voltage.

Figure 8:
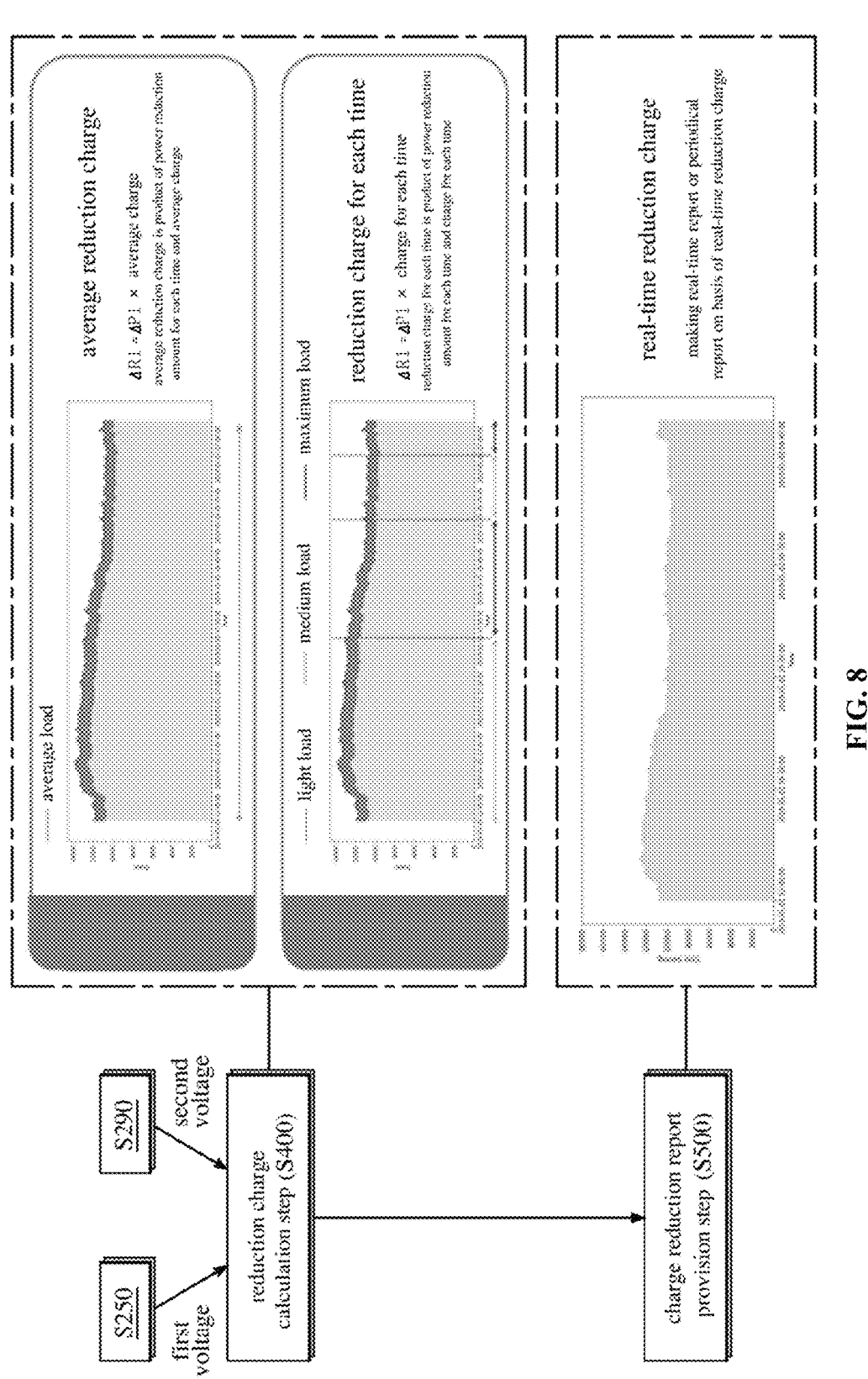
FIG. 8 is a view illustrating a reduction charge calculation step and a charge reduction report provision step of the present disclosure.

A voltage control method of the present disclosure is described with reference to FIGS. 3 and 8.

Referring to FIG. 3, a voltage control method of the present disclosure may include at least one of a data collection step S100, a target voltage calculation step S200, a voltage control step S300, a reduction charge calculation step S400, and a charge reduction report provision step S500.

In the data collection step S100, the data collector 220 can receive power data of the transformer 30 or the voltage regulation module 100.

The voltage control method of the present disclosure may include a communication connection state checking step S120 that checks the communication connection state between the voltage regulation module 100, which is a voltage regulation object, and the server 200.

In the communication connection state checking step S120, the local controller 150 can perform a local automatic operation mode 140 when communication between the voltage regulation module 100 and the server 200 is disconnected.

In the local automatic operation mode 140, the local controller 150 can determine the position of a measurement point at which a voltage is to be regulated by determining a transmission direction of power flowing to a corresponding voltage regulation module 100.

In the local automatic operation mode 140, the local controller 150 can regulate the voltage of the voltage regulation module 100 or the measurement point to a preset reference voltage or a reference value or can stop or discontinue voltage regulation, which may be determined in accordance with the kind of the load 50 that consumes power, transmits power backward, or the like.

The target voltage calculation step S200 may include at least one of a data synchronization step S210, a missing value compensation step S230, a first voltage calculation step S250, a power loss prediction step S270, and a second voltage calculation step S290.

The target voltage calculation step S200 may be a step of calculating a target voltage that is a final voltage to be regulated of the voltage regulation module 100. The target voltage may include the first voltage of the first voltage calculator 250 of the second voltage of the second voltage calculator 290.

In the target voltage calculation step S200, the target voltage may be determined as at least one of a first voltage calculation reflecting only a voltage drop by the first voltage calculation S250, step an increased voltage value reflecting a line power loss amount of the power loss prediction step S270, and a second voltage corrected by considering a line power loss amount in a first voltage of the second voltage calculation step S290, depending on the kind of the load 50 based on power consumption, backward transmission to a power system, or the like, the flow direction of power, the positions of the measurement points 101 and 102 that are voltage regulation objects, or the like.

The data synchronization step S210 may be performed earlier than other steps included in the target voltage calculation step S200 in respect of data preprocessing.

In the data synchronization step S210, the data synchronizer 230 can synchronize power data of a plurality of voltage regulation modules 100.

In the data synchronization step S210, the data synchronizer 230 can primarily perform time synchronization according to time on power data collected from the transformer 30 or the voltage regulation module 100 and can secondarily perform phase synchronization on voltage data, etc.

In the data synchronization step S210, the data synchronizer 230 can set a synchronization reference point of power data and can use the upstream first measurement point 31 of the transformer 30, which particularly corresponds to an upper divergence point of a plurality of voltage regulation modules 100 that are voltage regulation objects, as a synchronization reference point.

The missing value compensation step S230 may be performed earlier than S250, S270, or S290 that calculates a target voltage.

In the missing value compensation step S230, the missing value compensator 240 can process a missing value generated from power data that have undergone the data synchronization step S210.

In the missing value compensation step S230, the missing value compensator 240 can estimate/predict a missing value from data excluding the missing value of power data of the voltage regulation module 100 having the missing value through learning or training using a machine learning model including a regression model, etc., or can estimate/predict a missing value using power data of another voltage regulation module 200 excluding the power data of the voltage regulation module 100 having the missing value.

In the first voltage calculation step S250, the first voltage calculator 250 can calculate a first voltage included in an allowable range and considering a power reduction amount due to a voltage drop by CVR.

In the first voltage calculation step S250, the first voltage calculator 250 can calculate a first voltage on the basis of a predicted voltage (V_predicted) calculated by the cooperative controller 210 or the predicted voltage calculator. When a voltage drop is determined on the basis of V_predicted, the possibility of a loss due to a low voltage or an excessive voltage can be reduced in comparison to directly dropping a voltage from a current voltage (V_current), so the voltage control device can be more stably operated.

In the first voltage calculation step S250, the first voltage calculator 250 can use a Conservation Voltage Reduction factor (CVR factor or CVRf) to calculate a first voltage using a CVR effect.

The CVRf may be a rate of change of power to a rate of change of voltage. For example, when power drops 2% as a voltage drops 1%, the CVR factor may be 2. The CVRf can be used to estimate an actually reduced power reduction amount.

A CVR factor for each of loads connected as the downstream side of the voltage regulation module 100 continuously changes, so they need to be periodically scanned or collected. Power data collection, transmission, learning, predicting, or the like of the present disclosure can be performed in the basic unit of second/minute, so the period unit for scanning or collection the CVR factors of respective loads can also be set as second/minute/hour.

Estimation or calculation of a power reduction amount according to a voltage drop, a line power loss amount according to line resistance, a predicted voltage, a target voltage, a reduction charge, or a CVRf may also be performed close to real time.

For this reason, sufficient power data for calculating a CVR factor can be collected for each load, so a CVR factor can be calculated as a specific constant for each load through an average value, etc. Accordingly, when a voltage drop that is determined in accordance with target voltage calculation is calculated, a power reduction amount due to a voltage drop for CVR can be calculated by multiplying the voltage drop (amount) by a CVR factor.

For example, when a current voltage is 225V, a future predicted voltage reflecting tendency is calculated, a first voltage corresponding to a voltage drop due to CVR, a line power loss amount, and a target voltage (a corrected second voltage) considering the line power loss amount in the first voltage are calculated on the basis of the predicted voltage, and the target voltage is 220V, and when a CVR factor of each load for the voltage regulation module 100 that is a voltage regulation object is 1.2 (kW/V) from past power data, a power reduction amount due to CVR can be calculated as a voltage drop (5V)*CVR factor (1.2).

Referring to FIG. 6, the first voltage calculation step S250 may include at least one of a load voltage actual measurement step S251, a load CVR factor collection and storage step S253, a CVR factor represent value calculation step S255, and a CVR factor-based power reduction amount calculation step S257. The first voltage calculation step S250 can calculate a first voltage corresponding to power reduction amount due to CVR. The first voltage calculation step S250 may be included in the target voltage calculation step S200 or the loss function step S240.

The load voltage actual measurement step S251 may correspond to the data collection step S100 and can be continuously performed in accordance with a set basic scan or collection unit. When a CVR factor is included in power data that are collected from the voltage regulation module 100 but is maintained within a predetermined range for a predetermined period like the inherent characteristic of the load 50, the CVR factor may have a scan or collection period separately from the power data of the data collection step S100.

In the power data that are collected from the voltage regulation module 100, information for calculating a CVR factor may be included, and voltage data of each load, power data of each load, a voltage regulation time of each voltage regulation module 100 or each voltage regulator 130, etc. may be included.

The load CVR factor collection and storage step S253 may include at least one of a measurement time-based sorting step S260, a load state-based sorting step S263, and a represent value-based sorting step S266.

The measurement time-based sorting step S260 may include a case in which a predetermined condition by a voltage, power, etc. is satisfied (S261) and a case in which a CVR factor of each load is calculated when the voltage regulation module 100 is operated without condition or in accordance with the operation time of the voltage regulation module 100.

In step S261, the CVR factor calculator or a conservation voltage reduction factor calculator can calculate a CVR factor from voltage and power variation in the unit of second such as 1 second and 10 seconds or in the unit of minute such as 1 minute and 5 minutes before and after a point in time at which a predetermined condition is satisfied from power data of the voltage regulation module 100 collected in the data collector 220.

Step S262 may be used even when only power data, voltage data, etc. exist and data recording the operation time of the voltage regulation module 100 or the voltage regulator 130 do not exist.

In the condition of step S261, whether a voltage difference $\Delta V$ or a power difference $\Delta P$ is a positive value or a negative value, whether a voltage difference $\Delta V$ or a power difference $\Delta P$ satisfies a range such as preset minimum values min_P and min V and maximum value max P, whether a CVRf of each load satisfies a range of an upper limit max_CVRf or a lower limit min_CVRf, etc. may be included Estimation of a CVR factor by step S261 may be useful even in a situation in which it is difficult to control the voltage regulation module 100 or the voltage regulator 130. In this case, variation of a voltage may be generated by variation of a load (variation of power) and an estimated CVR factor may be unclear in causality, so it is possible to make up for this problem by putting a condition such as <the rate of change of voltage and power is 1% or more> or <the directions of variation are same>.

Examples of conditions of step S261:

Condition 1. $\Delta V > 0, \Delta P > 0,$ or $\Delta V < 0, \Delta P < 0$

Condition 2. $min\_P < \% \; \Delta P < max\_P$

Condition 3. $min\_V < \% \; \Delta V$

Condition 4. $min\_CVRf < CVR \; Factor < max\_CVRf$

Power data of each load, voltage data of each load, and data recording the operation point in time of the voltage regulation module 100 or the voltage regulator 130 may be included in data that are transmitted from the voltage regulation module 100 to the data collector 220.

In step S261, the CVR factor calculator 255 can calculate a CVR factor from voltage variation or power variation in the unit of second such as 1 second and 10 seconds or in the unit of minute such as 1 minute and 5 minutes before and after the operation point in time of the voltage regulation module 100 or the voltage regulator 130.

Since power may also be greatly influence while a voltage change at the power conversion operation point in time of the voltage regulation module 100 or the voltage regulator 130, it is possible to estimate a CVR factor using the ratio of the rate of change of power to the rate of change of voltage between the number of operation points in time.

The load state-based sorting step S263 may include a case in which a CVR factor is calculated on the basis of a load state including the operation state, the output amount, the load amount (power consumption amount), etc. of a load (S264) or a case in which a CVR factor is calculated irrespective of/regardless of the load state.

In step S264, the CVR factor calculator 255 can calculate a CVR factor in accordance with a load state including a power consumption amount of each load such as the operation state, the output amount (power), etc. of a node facility (load facility). The load state may be classified into maximum load, medium load, light load, etc., depending on a load amount. Step S265 may calculate a CVR factor irrespective of a load state of each load unlike S264.

The represent value-based sorting step may S266 calculating a represent value of CVR factors of loads by taking (S267) or averaging (S268) a recent value from a CVR factor calculated by the measurement time-based sorting step S260 or the load state-based sorting step S263.

In the case of taking a recent value S267, a recent CVR-related characteristic of a corresponding load may be reflected. Since a recent value is used, it is possible to reflect a power reduction ratio that is the most suitable for the current situation, but the variation of the power reduction ratio may be large when the load situation rapidly changes.

In the case of calculating an average value S268, an average CVR-related characteristic for each predetermined period such as 1 day, 1 week, 1 month, and 1 year of a corresponding load may be reflected. For example, since a CVR factor may be influenced by seasons, it is possible to reflect an average CVR-related characteristic of a load facility by dividing a period into seasons and taking an average value.

As a result, the CVR factor of each load calculated in the load CVR factor collection and storage step S253 may be calculated by at least one of measurement time-based methods S260, load state-based methods S263, and represent value-based methods S266, or a combination thereof.

The CVR factor represent value calculation step S255 can calculate a CVR factor represent value that is used when calculating a target voltage of the voltage regulation module 100 that is a voltage regulation object using the CVR factors of loads obtained in the load CVR factor collection and storage step S253.

The CVR factor represent value may be obtained by methods such as averaging or weighting-averaging the CVR factors of the loads 50 positioned at the downstream side of a corresponding voltage regulation module 100.

In this way, even though the divergence structure of loads disposed at the downstream side of a corresponding voltage regulation module 100 is changed due to change or removal, it is possible to calculate a CVR factor represent value of the voltage regulation module 100. Further, it diverges complexly into multiple steps of voltage regulation modules 110 and 120, it is possible to calculate a CVR factor represent value of the upstream voltage regulation module 110 using the CVR factors of loads obtained in the load CVR factor collection and storage step S253, so it is possible to continuously calculate a power reduction amount or provide a reduction charge even though a facility is changed such as installation/removal of the voltage regulation module 100.

When the divergence structure of a power system is simple, the CVR factors of loads obtained in the load CVR factor collection and storage step S253 can be used intactly in the CVR factor represent value calculation step S255.

The CVR factor-based power reduction amount calculation step S257 may calculating a power reduction amount corresponding to a voltage drop due to CVR using a CVR factor, using the CVR factor represent value obtained in the CVR factor represent value calculation step S255.

The power reduction amount using the CVRf calculated in the CVR factor-based power reduction amount calculation step S257 may correspond to calculation of a first voltage of the first voltage calculation step S250.

The voltage regulation module 100 or the voltage regulator 130 of the present disclosure may include a tab conversion method such as a winding type of OLTC or a hybrid semiconductor type of voltage regulation method.

The former method may have limitation in predicting or estimating at least one of a first voltage, a line power reduction amount, a second voltage, a predicted voltage, and a target voltage from real-time collected power data of the voltage regulation module 100 of the present disclosure, and then applying it in a fine unit.

The latter method may include a hybrid semiconductor type of voltage regulator including a plurality of power semiconductor devices to be able to expand a voltage coverage simultaneously with keeping the range of a rate of change of voltage agreed by a manager or an operator. The voltage regulation module 100 or the voltage regulator 130 of the present disclosure may refer to a semiconductor type of electric circuit in combination, may be feedback controllers, and may include proportional, integral, and derivative controllers, or a combination thereof.

In the hybrid semiconductor type of voltage regulation method, the voltage regulation module 100 or the voltage regulator 130 of the present disclosure can be configured in a structure, which can obtain power level reduction and optimal power density, and can control a voltage, can convert some of the entire power through a process of AC-DC-AC, and can control a voltage, a current, and a power factor through a power converter without using a tab converter. Further, the voltage regulation module 100 or the voltage regulator 130 has no lifespan concept about the number of times of changing a voltage and can be controlled in real time by a Digital Signal Processor (DSP), so they may be suitable for controlling a power system of multiple levels composed of upper/lower systems.

Accordingly, when the voltage regulation module 100 or the voltage regulator 130 takes the semiconductor type of voltage regulation method that is the latter, it is possible to control voltage/power in a very fine control unit such as 0.1%. Such fine voltage control may result in voltage/power control without deterioration of quality even in a complexly diverging power system including a multi-step voltage regulation module 120 like the downstream voltage regulation module 120 by being linked with analysis of power data of each load and calculation of a target voltage.

In the power loss prediction step S270, the power loss predictor 260 can predict or calculate a power loss amount due to a line from the voltage regulation module 100 to the load 50.

In the power loss prediction step S270, the larger the voltage drop, the more the line loss power may increase, so the power loss predictor 260 can calculate line loss power that raises back a first voltage due to a voltage drop of the first voltage calculation step S250.

In the second voltage calculation step S290, the second voltage calculator 270 can calculate a second voltage corrected in consideration of the first voltage of the first voltage calculation step S250 or the power loss amount of the power loss prediction step S270.

In the voltage control step S300, the cooperative controller 210 can give the target voltage, which is calculated through at least one of the first voltage calculation step S250, the power loss prediction step S270, and the second voltage calculation step S290, to the voltage regulation module or the voltage regulator 130, or can control the voltage of the voltage regulator 130 or the measurement points 101 and 102 as a target voltage.

After the voltage control step S300, the reduction charge calculation step S400 or the charge reduction report provision step S500 that shows a gain by a target voltage to an operator/manager of the voltage control device of the present disclosure may be performed.

In the reduction charge calculation step S400, the reduction charge calculator 280 can calculate a charge reduced by a target voltage calculated from at least one of the first voltage of the first voltage calculation step S250, the loss power amount of the power loss prediction step S270, and the second voltage of the second voltage calculation step S290.

For example, the reduction charge may include an average reduction charge that is the product of a power reduction amount for each time and an average charge, or a reduction charge for each time that is the product of power reduction amount for each time and a charge for each time.

In the charge reduction report provision step S500, the charge reduction report provider 2990 can make a real-time report or a report for each period on the basis of a real-time reduction charge and can provide the real-time report or the report for each period to an operator or a manager of the voltage control device of the present disclosure.

What is claimed is:

1. A voltage control device comprising:
a voltage regulation module configured to be able to regulate a voltage that is supplied to a load or is transmitted backward from a load;
a power loss predictor configured to predict or calculate a power loss amount due to a line of a power system; and
a cooperative controller configured to control the voltage regulation module to a target voltage or to transmit the target voltage to the voltage regulation module, wherein the cooperative controller is configured to generate the target voltage by setting a loss function including:
(i) a first component corresponding to a power reduction amount obtained by conservation voltage reduction (CVR), the first component being determined as a first-order function of a voltage difference ($\Delta V$) corresponds to voltage variation at different points in time before and after voltage variation for the voltage regulation module, the first component being calculated as a product of a CVR factor (CVRf) and the $\Delta V$ where the CVRf is a predetermined constant of an average value from power data of the voltage regulation module and where the power reduction amount is proportional to the $\Delta V$; and
(ii) a second component corresponding to a power loss amount caused by a line resistance between the voltage regulation module and a power supply point, the second component being determined as a square or second-order function of the $\Delta V$;
wherein the voltage variation at different points of the voltage regulation module includes a first measurement point located upstream of the voltage regulation module and a second measurement point located downstream of the voltage regulation module; and
wherein a local controller of the voltage regulation module is configured, when communication between the voltage regulation module and a server is lost, to switch to a local automatic mode, to operate the voltage regulation module autonomously, to determine a direction of power flow based on the power data of the voltage regulation module by determining the direction as a forward direction when a power factor is positive and as a reverse direction when the power factor is negative, and to select one of the first and second measurement points as a control target voltage based on the determined direction.

2. The voltage control device of claim 1, wherein the loss function is expressed as a polynomial for the voltage or the $\Delta V$ related to the voltage regulation module, and minimizing a power charge of the voltage regulation module that is a voltage regulation object corresponds to finding minima, maxima, or local solutions of the loss function.

3. The voltage control device of claim 1, wherein the second component corresponds to raising a voltage back against a voltage drop by the first component.

4. The voltage control device of claim 1, wherein the loss function includes the first component includes a linear function or a linear expression for a voltage or a voltage difference related to the voltage regulation module.

5. The voltage control device of claim 1, wherein the loss function includes the power reduction amount is determined by the target voltage or a linear function or a linear expression of the $\Delta V$ including the target voltage.

6. The voltage control device of claim 1, wherein the second component is the power loss amount from the voltage regulation module to the power supply point connected along the line of the power system, and the power supply point includes the load or another voltage regulation module.

7. The voltage control device of claim 1, wherein the loss function includes the second component is determined by a quadratic function or a quadratic for the voltage or the $\Delta V$ related to the voltage regulation module.

8. The voltage control device of claim 1, wherein the loss function includes the line power loss amount is calculated by the square or a quadratic function of the $\Delta V$, and the $\Delta V$ corresponds to the voltage variation between different points including the voltage regulation module and the load at the same point in time.

9. The voltage control device of claim 1, wherein the loss function includes the line power loss amount is determined by the target voltage or a quadratic function or a quadratic of the $\Delta V$ including the target voltage.

10. A voltage control method comprising:
a data collection step in which power data of a voltage regulation module, which is configured to regulate a voltage that is supplied to a load or is transmitted backward from a load, are transmitted to a data collector;
a target voltage calculation step of calculating a target voltage to be regulated of the voltage regulation module; and
a voltage control step of controlling the voltage regulation module to the target voltage or transmitting the target voltage to the voltage regulation module, wherein the target voltage calculation step includes a loss function having:
(i) a first component corresponding to a power reduction amount obtained by conservation voltage reduction (CVR), the first component being determined as a first-order function of a voltage difference ($\Delta V$) corresponds to voltage variation at different points in time before and after voltage variation for the voltage regulation module and calculated as a product of the $\Delta V$ and a CVR factor (CVRf) that is a predetermined constant of an average value from power data of the voltage regulation module and where the power reduction amount is proportional to the $\Delta V$; and
(ii) a second component corresponding to a line-power-loss amount according to a line resistance between the voltage regulation module and a power-supply point, the second component being determined as a square or second-order function of the $\Delta V$;

wherein the loss function step includes finding a solution of the loss function to determine the target voltage;

wherein the voltage variation at different points of the voltage regulation module includes a first measurement point located upstream of the voltage regulation module and a second measurement point located downstream of the voltage regulation module; and wherein a local controller of the voltage regulation module is configured, when communication between the voltage regulation module and a server is lost, to switch to a local automatic mode, to operate the voltage regulation module autonomously, to determine a direction of power flow based on the power data of the voltage regulation module by determining the direction as a forward direction when a power factor is positive and as a reverse direction when the power factor is negative, and to select one of the first and second measurement points as a control target voltage based on the determined direction.

11. The voltage control method of claim 10, wherein the loss function step includes a loss function forming step in which a cooperative controller sets the loss function showing the power reduction amount or a power loss amount related to the voltage regulation module, which is a voltage regulation object, or the load connected to the voltage regulation module, and the cooperative controller, in the loss function forming step, sets the loss function including the first component corresponding to the power reduction amount using the CVR and the second component corresponding to the power loss amount according to the line resistance.

12. The voltage control method of claim 10, wherein the loss function step includes a loss function minimal solution calculation step in which a cooperative controller finds a solution that minimizes a power loss when the loss function shows a power loss amount of the voltage regulation module, finds a solution that maximizes power reduction when the loss function shows the power reduction amount of the voltage regulation module, or finds local maxima or minima of the loss function, and the cooperative controller calculates the target voltage from the solutions of the loss function.

13. The voltage control method of claim 10, wherein the loss function is expressed as a quadratic polynomial for the voltage or the $\Delta V$ related to the voltage regulation module, and minimizing a power charge of the voltage regulation module that is a voltage regulation object corresponds to finding minima, maxima, or local solutions of the loss function including a component corresponding to a polynomial including a quadratic for the voltage or the $\Delta V$ related to the voltage regulation module.

* * * * *